(12) United States Patent
Marcé et al.

(10) Patent No.: US 11,449,761 B2
(45) Date of Patent: Sep. 20, 2022

(54) EFFICIENT VALUE LOOKUP IN A SET OF SCALAR INTERVALS

(71) Applicant: FAIR ISAAC CORPORATION, Roseville, MN (US)

(72) Inventors: Jean-Luc M. Marcé, Sunnyvale, CA (US); Gabrio Verratti, Gig Harbor, WA (US); Abdur Rafay, Santa Clara, CA (US); Andrei R. Yershov, Cupertino, CA (US); John Wearing, San Anselmo, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 903 days.

(21) Appl. No.: 16/177,222

(22) Filed: Oct. 31, 2018

(65) Prior Publication Data

US 2020/0134474 A1    Apr. 30, 2020

(51) Int. Cl.
| | |
|---|---|
| *G06N 5/00* | (2006.01) |
| *G06N 7/08* | (2006.01) |
| *G06N 5/02* | (2006.01) |
| *G06F 16/901* | (2019.01) |
| *G06F 16/903* | (2019.01) |

(52) U.S. Cl.
CPC ......... *G06N 5/003* (2013.01); *G06F 16/9017* (2019.01); *G06F 16/90335* (2019.01); *G06N 5/025* (2013.01); *G06N 7/08* (2013.01)

(58) Field of Classification Search
CPC ........... G06N 5/003; G06N 5/025; G06N 7/08
See application file for complete search history.

(56) References Cited

U.S. PATENT DOCUMENTS

| | | | |
|---|---|---|---|
| 6,370,518 B1* | 4/2002 | Payne | G06F 16/2423 |
| 2008/0091491 A1* | 4/2008 | Thorpe | G06F 16/2423 707/805 |
| 2008/0300851 A1* | 12/2008 | Chakrabarti | G06F 8/433 703/22 |
| 2015/0095379 A1* | 4/2015 | Dickie | G06F 16/22 707/803 |
| 2015/0293750 A1 | 10/2015 | Yershov et al. | |
| 2017/0147307 A1 | 5/2017 | Yershov et al. | |

\* cited by examiner

*Primary Examiner* — Lut Wong
(74) *Attorney, Agent, or Firm* — Mintz Levin Cohn Ferris Glovsky and Popeo, P.C.

(57) ABSTRACT

In one aspect, a computer implemented method for efficient value lookup in a set of scalar intervals is provided. The method includes determining, in response to a query for a scalar value, that the scalar value is located in a set of scalar intervals, wherein each of the scalar intervals comprises a left bound and a right bound. The method further includes sorting the scalar intervals based on left bounds. The method further includes comparing, in response to the sorting, a pair of scalar intervals to determine if the pair of scalar intervals overlaps. The method further includes identifying, based on the comparing indicating that the pair overlaps, a method of processing the scalar intervals.

8 Claims, 5 Drawing Sheets

EFFICIENT VALUE LOOKUP IN A SET OF SCALAR INTERVALS

TECHNICAL FIELD

The subject matter described herein relates to efficient evaluation of scalar intervals.

BACKGROUND

Analytics leverage massive amounts of data to deliver insight into different behavior and propensities, which enables systems to render more precise decisions or relevant offers. After an analytic model has been developed, it may be operationalized by integration into automated decision-making systems and processes. The analytics may be translated into a rule language which offers the additional value of being able to execute and deploy the models in other environments.

SUMMARY

This document presents systems, methods, and techniques to efficiently sort and analyze scalar intervals.

In one aspect, a computer implemented method is provided. The method includes determining, in response to a query for a scalar value, that the scalar value is located in a set of scalar intervals, each of the scalar intervals include a left bound and a right bound. The method further includes sorting the set of scalar intervals based on left bounds. The method further includes comparing, in response to the sorting, a pair of scalar intervals to determine if the pair of scalar intervals overlaps. The method further includes identifying, based on the comparing indicating that the pair overlaps, a method of processing the scalar intervals.

In another aspect, a non-transitory computer program product storing instructions that, when executed by at least one programmable processor, cause at least one programmable processor to perform operations is provided. The operations include determining, in response to a query for a scalar value, that the scalar value is located in a set of scalar intervals, each of the scalar intervals include a left bound and a right bound. The operations further include sorting the set of scalar intervals based on left bounds. The operations further include comparing, in response to the sorting, a pair of scalar intervals to determine if the pair of scalar intervals overlaps. The operations further include identifying, based on the comparing indicating that the pair overlaps, a method of processing the scalar intervals.

In another aspect a system is provided. The system includes at least one programmable processor. The system further includes a machine-readable medium storing instructions that, when executed by the at least one processor, cause the at least one programmable processor to perform operations. The operations include determining, in response to a query for a scalar value, that the scalar value is located in a set of scalar intervals, each of the scalar intervals include a left bound and a right bound. The operations further include sorting the set of scalar intervals based on left bounds. The operations further include comparing, in response to the sorting, a pair of scalar intervals to determine if the pair of scalar intervals overlaps. The operations further include identifying, based on the comparing indicating that the pair overlaps, a method of processing the scalar intervals.

In some variations one or more of the following may optionally be included. The sorting may be further based on whether the left bounds are open or closed when left bound values are identical. The sorting may be further based on right bound values when left bound values are identical and the left bounds are either both open or both closed. The comparing may include comparing a first right bound value of a first scalar interval with a second left bound value of a second scalar interval, wherein the first scalar interval precedes the second scalar interval. The comparing may further include determining that the first scalar interval overlaps with the second scalar interval when the first right bound value is greater than the second left bound value. The identifying may include grouping scalar intervals that overlap into a first group. The identifying may further include grouping scalar intervals that do not overlap into a second group. The method and/or operations may further include selecting, based on the identifying, the method of processing the scalar intervals. The selecting may include selecting a first method of processing for first group and selecting a second method of processing for the second group. The first method of processing may include a sequential method of processing and the second method of processing may include a binary-search method of processing. The method or operations may further include dividing the first group into a plurality of non-overlapping scalar intervals. The selecting may include selecting a binary-search method of processing for the plurality of non-overlapping scalar intervals. The method or operations may further include transforming a ruleset into a directed acyclic graph, the directed acyclic graph including a plurality of nodes and a plurality of branches. The method or operations may further include grouping branches of the directed acyclic graph based on identified similarities across the plurality of branches and creating a modified directed acyclic graph based on the grouping. At least one group of branches of the modified acyclic graph may include scalar intervals, and the identifying the method of processing may be based further on the at least one group.

Implementations of the current subject matter may include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which may include a computer-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a rule management system or other software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to an enhanced organization of rules that enables the rules to be efficiently evaluated. The enhanced organization may eliminate redundant evaluations and may make optimal transformations of those rules into a code executable on a computer platform. In a process of transformation, rules may be translated into a structured rule language (SRL) program which may be translated into a different programming environment such as Java, .NET, C, or COBOL.

Rules, rulesets, and ruleset metaphors are forms of processing logic commonly used in a Business Rule Management System (BRMS). A rule may express logic in the form of a set of conditions evaluated on some input, paired with a set of actions executed if the rule conditions evaluated are true. Rules are typically grouped in a structure called a ruleset. Ruleset metaphors may take various forms, including decision tables, decision trees, decision graphs, and scorecards. Each of these forms may provide a different way to express a set of rules in a way that may best match a natural representation for a given use case. As used herein, the term rulesets may refer to both rulesets and ruleset metaphors.

Rulesets may be pre-processed and transformed to improve their run time execution performance, taking advantage of their specific structure. For example, a ruleset may be converted into a directed acyclic graph (DAG) and then a processor may generate an individual ruleset to handle each condition node of the DAG. A directed acyclic graph (DAG) is a directed graph with no cycles or loops. A directed graph is a set of nodes connected by a set of directed edges, also known as links or arcs, connecting the nodes. If represented graphically, the arcs of the DAG may have arrows indicating directionality of the arc, such as an outgoing arc or an incoming arc.

In some aspects, instead of generating an individual ruleset for each branch, the DAG may be further analyzed to look for similarities across branch conditions. Branches with similarities may be grouped into homogeneous groups. The ruleset may then be persisted in a modified DAG structure which includes the groups. This modified DAG structure may then be serialized in a form that is more compact than its original representation because many property references and values may be shared across nodes. This more compact DAG structure may save storage needs, memory, and loading time for a decision management system. The creation of the modified DAG may also produce a more efficient execution at runtime as each group may be processed using a method that is optimal for a given group type or an aspect of the group.

Figure 1:
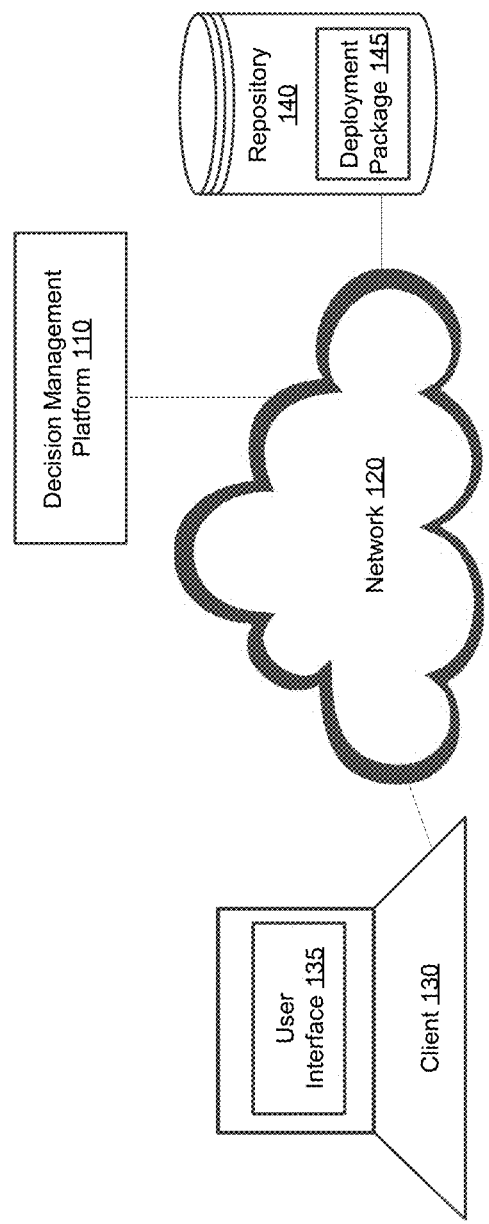
FIG. 1 depicts a system diagram illustrating a decision management system, in accordance with some example implementations.

FIG. 1 depicts a system diagram illustrating a decision management system 100, in accordance with some example implementations. Referring to FIG. 1, the decision management system 100 may include a decision management platform 110. In some implementations of the current subject matter, the decision management platform 110 may be a Platform-as-a-Service (PaaS) that is deployable in a public and/or a public cloud setting. The decision management platform 110 may also be a server or other computing apparatus configured to organize and process complex rule logic. As shown in FIG. 1, the decision management platform 110 may be communicatively coupled, via a wired and/or wireless network 120, with a client 130 and a repository 140. The client 120 may be a device that includes at least one processor and at least one memory including program code such as, for example, a computer, a tablet, a mobile device, a smart phone, and/or the like. The network 120 may be the Internet, a public land mobile network, a wireless local area network (WLAN), a wide area network (WAN), a point-to-point link, and/or the like.

In some implementations of the current subject matter, the decision management platform 110 may support the development of a solution by a user at the client 130. The decision management platform 110 may provide, to the client 130, a user interface 135 that is configured to display a graphical representation of the solution. As noted earlier, the graphical representation of the solution may be a directed acyclic graph (DAG) having a plurality of nodes. The decision management platform 110 may analyze the DAG and generate a modified DAG based on the analyzing. The solution may also include translating the DAG and/or modified DAG into a programming language such as COBOL, C, Java, and/or the like.

Figure 2:
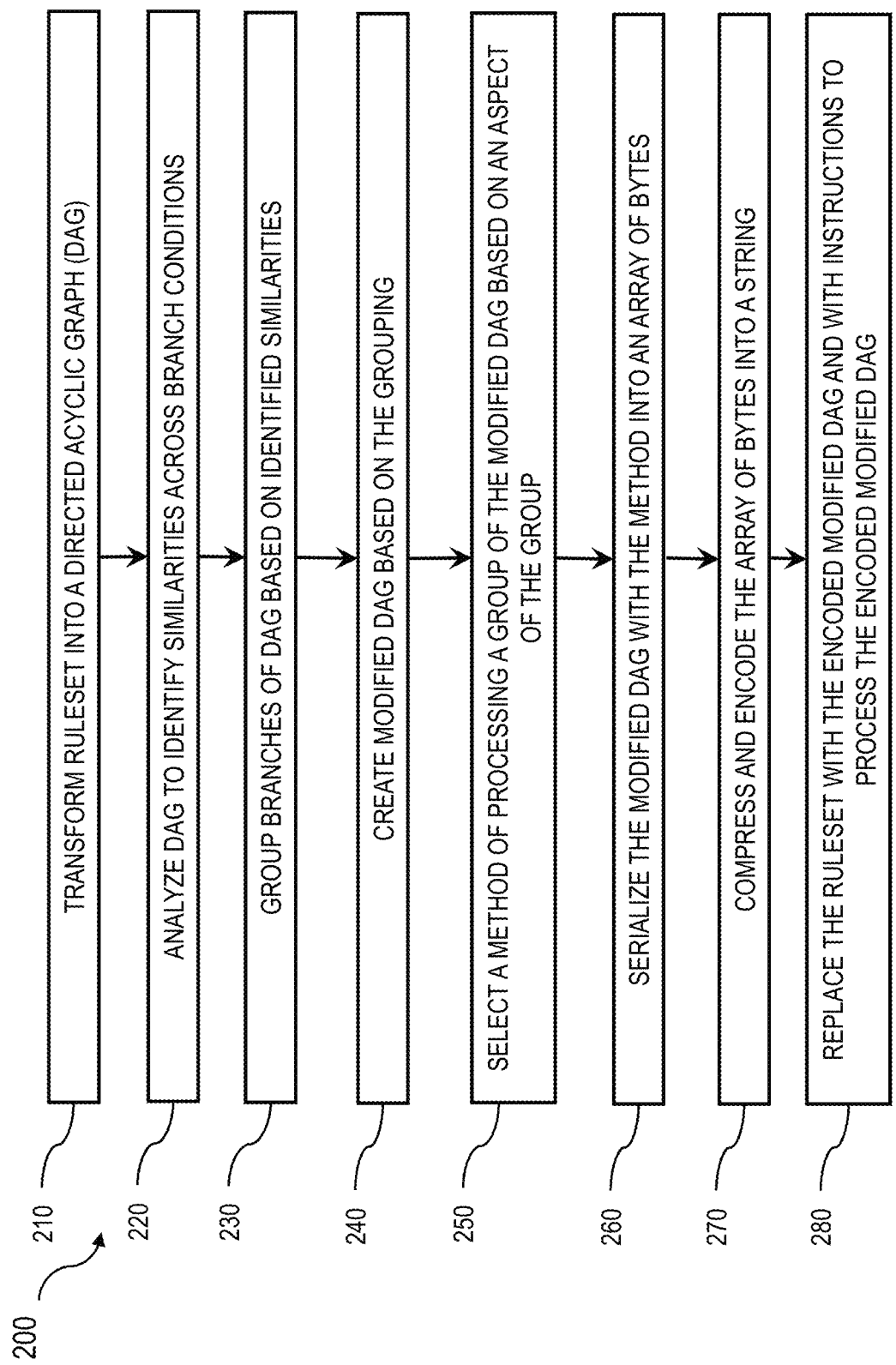
FIG. 2 depicts a flowchart illustrating a process for creating and executing a modified directed acyclic graph, in accordance with some example implementations.
Figure 3:
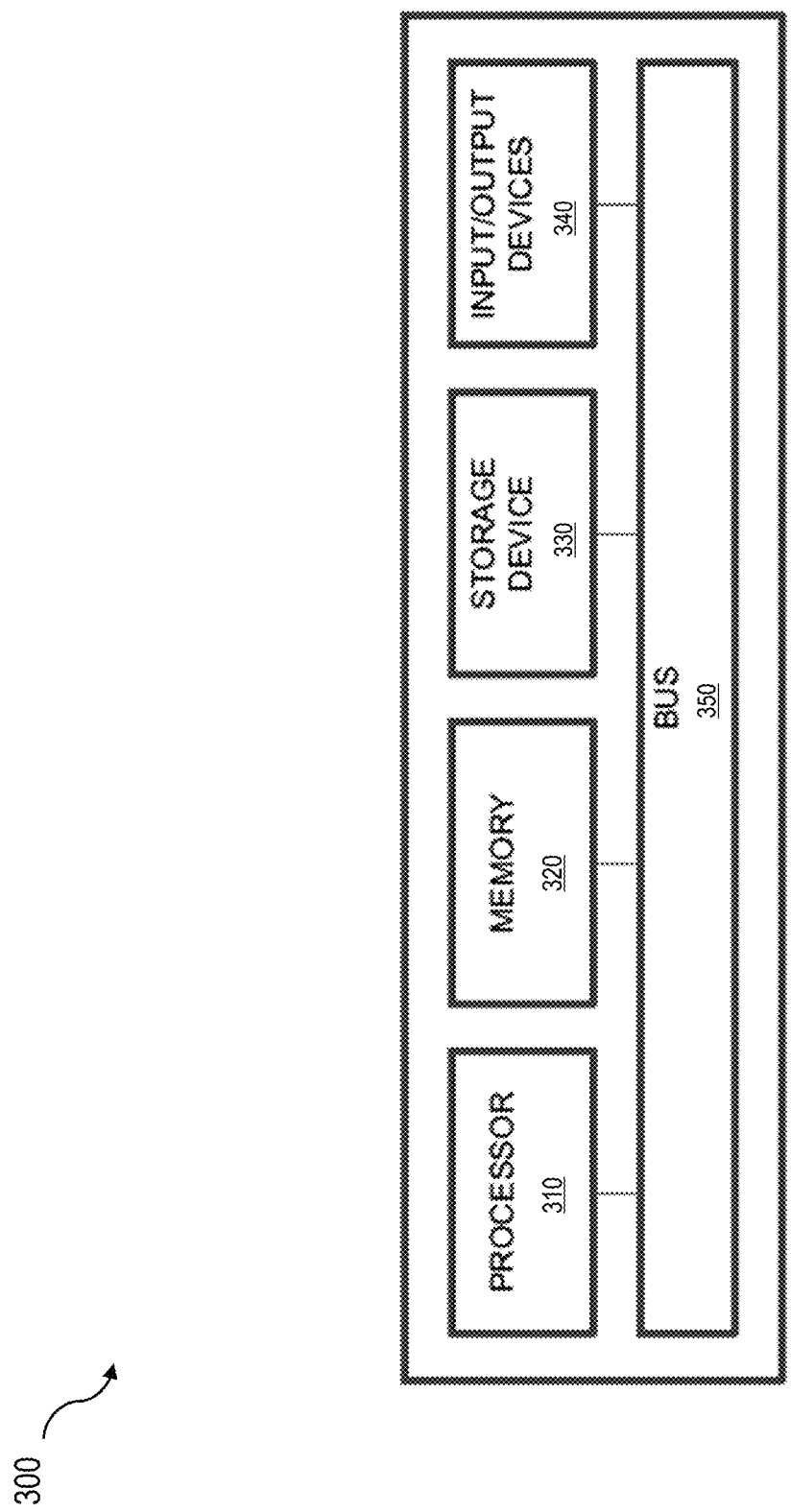
FIG. 3 depicts a block diagram illustrating a computing apparatus, in accordance with some example implementations.

FIG. 2 depicts a flowchart illustrating a process 200 for creating and executing a modified directed acyclic graph, in accordance with some example implementations. Referring to FIGS. 1 and 3, the process 200 may be performed by the decision management platform 110 and/or the computing apparatus 300.

At operation block 210, a decision management platform 110 may transform a ruleset into a DAG. For example, the decision management platform 110 may transform the rules into the DAG as described in U.S. patent application Ser. No. 14/250,918, filed on Apr. 11, 2014, and herein incorporated by reference in its entirety. Thereafter, at operation block 220, the decision management platform 110 may analyze the DAG to identify similarities across branch conditions and/or nodes of the DAG. In some aspects, analyzing the DAG may include scanning branches of the DAG to determine which conditions and/or rules apply to each branch. The decision management platform 110 may compare conditions and/or rules to identify similarities. For example, for each node, the decision management platform 110 may check the properties involved in the emanating branch conditions and regroup conditions based on which property they relate to. In some implementations, the similarities may be based on aspects of the branches such as, condition types and/or nodes including: a comparison of Boolean parameter with a Boolean value; a comparison of properties of a string type, a category type, and/or an enumeration type; a comparison of scalar properties with values of the same type; and/or the like.

Later, at operation block 230, the decision management platform 110 may group branches of the DAG based on the identified similarities. For example, DAG branches including conditions that compare the value of a property of Boolean type against a constant Boolean value may be grouped together to form a Boolean group. The Boolean group may include branch conditions that share the same property reference and differ only by the respective constant Boolean value. In some implementations, DAG branches including conditions that compare the value of a given property of string type or enumeration type against a constant value may be grouped together to form a Lookup group. The Lookup group may include the DAG branches where the branch conditions share the same property reference and differ only by the respective constant value.

In some aspects, DAG branches including conditions that check whether the value of a given property of a scalar type (such as integer, long, decimal, real, double, date, time, duration, money, and/or the like) is contained within one or more ranges of values may also be grouped together to form a Ranges group. A scalar type is a data type where the data holds a numeric value. The Ranges group may include DAG branches where the branch conditions share the same property reference and differ only by the range(s) that the property is compared against. A range may be defined as any scalar interval, where each boundary may be either infinite or finite and each boundary may be either an open or a close boundary. Additional analysis may further distinguish the Ranges group as either a Separate Ranges group or an Overlapping Ranges group. For example, a case where ranges are separate from each other (e.g., range values do not overlap) may be identified as a Separate Ranges group. A case where the range values overlap may be identified as an Overlapping Ranges group.

BRMS systems may provide built-in mechanisms to track whether a property is null (it contains an object reference that refers to no object), unknown (the value has not been determined yet), or unavailable (an attempt to determine the value was made but was unsuccessful). BRMS systems may also provide a syntax in rule conditions to check whether a property has a special value (e.g., null, known, unknown, available, unavailable, etc.). Branches holding special value conditions may also be grouped together to form a Special Conditions group.

Conversely, a branch holding a condition that is always true (e.g., a Not Applicable condition may be expressed as a condition that is always true) may essentially be a pass-through branch whose children branches may be treated as if they were directly attached to the branch's parent node. Rather than adding such a N/A branch to a Special Conditions group, the N/A branch may be merged and the children branches treated as if there were direct children of the parent node.

In a DAG representing a ruleset or ruleset metaphor, terminal nodes may represent actions, also known as treatments. Those terminal action nodes may be grouped together in one or more groups. For instance, action nodes including an assignment of a constant value to a given property may be grouped together to form an Assignment group. Action nodes that cause the ruleset to return a value may be grouped together to form a Return group. Action nodes including a function or ruleset call may be grouped together to form a Call group. Other forms of condition and action groups may also be added.

In another implementation, to avoid generating one secondary function per action node, those secondary functions may be parameterized and shared between action nodes wherever possible. For example, the terminal action nodes may be converted into separate functions, where each constant value in the expression of the action node is replaced by a function parameter. The constant value(s) may be stored in an array which is retrieved at runtime once all the conditions are met for any action. The replaced variable points towards the index of the newly constructed array of constant values.

If a node has branches that cannot be all grouped within a single group, multiple groups may be created and grouped in a Composite group. While a Boolean group, a Ranges group, a Lookup group, a Special Conditions group, an Assignment group, a Return group, a Call group, and a Composite group are discussed above, the example embodiments described herein may equally apply to more or fewer groups.

Then, at operation block 240, the decision management platform 110 may create a modified DAG based on the grouping. The modified DAG structure may be more compact than its original representation because many property references and values may be shared across group nodes. Creating the modified, more compact DAG may save storage needs, memory and processing time for the decision management platform 110. The modified DAG may also produce a more efficient execution at runtime as each group may be processed using a method that is optimal for a given group.

For example, at operation block 250, the decision management platform 110 may select a method of processing a group of the modified DAG based on one or more aspects of the group. An aspect of the group may include the type of the variables involved in the branch conditions. The possible variable types may be Boolean, String, categories, enumerations, scalar types, and/or the like. For certain variable types, another aspect of the group may include other characteristics that apply specifically to such types. For instance, the decision management platform 110 may determine that a group of conditions comprises comparisons of a String variable against various constant values, in which case a first method of processing (e.g., hash-based processing) is more optimal than a second method of processing (e.g., sequential processing). A Lookup group may be optimized by constructing a hash map that may associate each distinct constant value with the corresponding branch or subgroups that the value is associated with. At execution time, the value of the property may be looked up in that hash map, and if there is a value match, the subgroups associated with that value may then be processed. In another case, the decision management platform 110 may determine that a group of conditions involves a variable of a scalar type and tests whether that variable is within various ranges that do not overlap with each other, in which case a first method of processing (e.g., binary search) is more optimal than a second processing method (e.g., sequential processing). In some aspects, after selecting the optimal method of processing, the decision management platform 110 may transform the modified DAG into a program that is based on a concurrent, class-based, object-oriented computer programming language, such as COBOL, C, Java, and/or the like. The decision management platform 110 may also execute the program.

The grouping and selection of an optimized processing method based on the group and/or group parameter, may have a number of advantages. For example, when transforming the modified DAG into a program, less code is generated which may also take less time to compile. Additionally, less memory is required for loading and holding the rulesets (e.g., decision table) and/or modified DAG in memory at runtime. Moreover, in contrast to an SQL approach, the modified DAG may eliminate the need for a separate database component which avoids increasing architecture and configuration complexity.

For groups including scalar values and intervals, such as the Separate Ranges and/or the Overlapping Ranges groups, the decision management platform 110 may select a processing method based on whether the intervals overlap or not.

Optionally, at operation block 260, the decision management platform 110 may serialize the modified DAG into a byte array, as further discussed below. Additionally, at operation block 270, the decision management platform 110 may compress the serialized byte array and/or encode the byte array or compressed byte array into a string of characters. At operation block 280, the decision management platform 110 may replace the original ruleset from operation block 210 with the encoded modified DAG and with the instructions to process the encoded modified DAG.

Referring back to operation block 230 of FIG. 2, during identifying and forming groups associated with scalar values, such as the Ranges group, the decision management platform 110 may be unable to efficiently find which interval(s) a scalar variable value falls in, using a minimum number of operations. In order to optimize this analysis, the decision management platform 110 may first analyze the set of intervals and then leverage the result of that analysis to optimize the lookup at execution time.

The analysis may include two phases. In the first phase, the intervals may be sorted using an order where the decision management platform 110 first compares any pair of intervals by their left bounds. If the two left bound values are identical, an interval with a closed left bound may be considered to precede an interval with an open left bound. If the two left bounds are identical and have the same open/closed attribute, the decision management platform 110 may then compare the right bounds. If the right bounds are also identical, the decision management platform 110 may consider an interval with an open right bound to precede an interval with a closed right bound. If both intervals have the same bounds with same open/close attributes, then both intervals are by construction equal, and only one of such intervals may be kept in the sorted list. The sorting itself may be achieved using various standard sorting algorithms such as QuickSort, where the comparisons are applied to the intervals rather than to scalar values. The ordering phase may beneficially order the ranges so that the decision management platform 110 may more easily detect whether there are any overlaps between ranges and if there are no overlaps, the ranges may be fully ordered in their natural sorting order.

In the second phase of the analysis, the intervals in the partially sorted set may be checked for overlaps. This may be done by checking each pair of consecutive intervals in the sorted set and comparing the right bound of the first interval (r1) with the left bound of the second interval (I2). If r1 is less than I2, then all values in the first interval are lower than all values in the second interval, and thus the first interval fully precedes the second interval and there's no overlap between those two. If r1 is equal to I2, then the decision management platform 110 may compare whether those two bounds are open or closed. If the two bounds are respectively open/open, open/closed, or closed/open, then the two intervals are also disjoint. If the two bounds are closed/closed, then the two intervals have an overlap on their common value r1/I2. If r1 is more than I2, then the two intervals have some intersection or overlap, which consists of the values between I2 and r1.

Once this analysis has been completed, the decision management platform 110 may determine whether to create a Separate Ranges group and/or an Overlapping Ranges group. Additionally, the result of the scalar interval analysis may be leveraged by the decision management platform 110 to optimize the lookup at execution time, depending on whether the intervals have overlap or not.

For example, if the decision management platform 110 determines that the scalar intervals analyzed have no overlap, such as in a Separate Ranges group, a scalar variable value may fall within at most one interval and hence the problem reduces to finding which interval (if any) the value falls within. To optimize this search, the decision management platform 110 may keep the intervals in the sorted order and may select a binary search algorithm (such as QuickSearch, where the comparisons are done between the target value and the interval bounds) to locate the interval containing the target variable value. Such algorithm may scale in a logarithmic scale, such $O(\log n)$, with the number of intervals being considered, which may be significantly faster than a sequential search. The selection of the binary search algorithm may be based on the identification of non-overlapping scalar intervals of the Separate Ranges group.

For large sets of intervals, a QuickSearch-like algorithm may be further accelerated by selecting pivot values that are not median values but that are values computed using a scaling formula involving the target variable value, the left bound of the first interval, and the right bound of the last interval. For instance, when looking up a US zip code within a set of zip code intervals, where each interval contains 10 consecutive zip codes, starting from [0,9] and ending with [99990,99999], the decision management platform 110 may accelerate the search for zip code 12345 by taking the interval #I as the pivot interval, where I=12345/10 or 1234, which would be the interval [12340,12349], which would be a direct hit in that case. In less fortunate cases, such scaling search would not give a direct hit but would still significantly reduce the number of pivot intervals to consider and hence reduce the search length.

Conversely, if the scalar intervals have any overlap, such as in an Overlapping Ranges group, then the target value may fall within multiple intervals. If the order of execution of the rules matters, then the overlapping rules may not be arbitrarily reordered but are kept in their original order so that the rules get executed in the expected order. Thus, a method of handling such a case may be to consider that the overlap may occur between any pair of rules, keep all intervals in their original order, and sequentially considering each interval and comparing its bounds with the target value.

In some aspects, if there is a large number of intervals and those intervals have some overlap, a more optimal method may include trying to break the set of intervals into multiple groups, where each group is either a set of non-overlapping intervals or the groups include a minimal set of overlapping intervals. For instance, taking an example of intervals [0,10), [10,20], [20,30), [30,100], the decision management platform 110 may break this set into two groups {G1: [0,10), [10,20], G2: [20,30],[30,100]}, with no overlap inside the groups but with overlap on value 20 between the two groups. In a second approach, the decision management platform 110 may break the intervals into 3 groups {G1: [0,10). G2: [10,20],[20,30). G3: [30,100]}, with no overlap between groups but with an overlap inside G2.

Then the search may be done on each group separately, using a binary search or accelerated search on non-overlapping intervals and a sequential search for overlapping intervals, then aggregating the results across groups. For example, the Separate Ranges group may be optimized by sorting the ranges by the numeric values of the range boundaries. At execution time, the value of the property is searched among the set of ranges using a binary search algorithm, and if the value belongs to any range, the sub-groups associated with that range are then processed. Other types of ranges may be processed in a sequential manner because a direct hash lookup or binary search cannot be applied in such cases. In some implementations, the decision management platform 110 may optimize an Overlapping Ranges group by trying to find as many sub-groups of separate ranges so that each sub-group may be treated as a Separate Ranges group and only the final processing of sub-groups may be done sequentially.

This overall approach may give an effective balance between efficient, hash-based or binary-search-based lookup mechanisms and the necessary sequential evaluations where they are needed. In most typical uses of rule systems, the majority of conditions in such rulesets and ruleset metaphors follow one of the efficient lookup forms (e.g., hash-based or binary search-based) so this hybrid approach may result in good scalability and performance for large rulesets and ruleset metaphors in typical cases.

Table 1 below illustrates some examples of sorting intervals with and without overlap and how those sorted intervals may be processed at runtime.

TABLE 1

| Original set of intervals | After sorting | # Overlaps | Explanations and runtime execution |
|---|---|---|---|
| [15, 20) | [0, 10) | 0 | Sorted by left bounds: 0 < 15 < 20. |
| [0, 10) | [15, 20) | | [0, 10) and [15, 20) do not overlap because 10 < 15. |
| [20, 100) | [20, 100) | | [15, 20) and [20, 100) do not overlap because right bound 20 is open. |
| | | | No overlap. At execution time, use binary search with sorted intervals. |
| (10, 20] | [10, 30) | 2 | Sorted by left bounds first: 10 < 20. |
| [20, 30] | (10, 20] | | There are two intervals starting with 10. The interval with a closed left bound goes first. |
| [10, 30) | [20, 30] | | The first two intervals overlap over the interval (10, 20]. |
| | | | The next two intervals overlap over the value 20. |
| | | | With multiple overlaps, we will use a sequential search with the original set. |
| [10, 20) | [10, 20) | 1 | Sorted by left bounds: |
| [20, 30) | [20, 30) | | 10 < 20 < 30 < 40 < 50. |
| [30, 40) | [30, 40) | | Intervals do not overlap except |
| [40, 50) | [40, 50) | | [30, 40)and [40, 50) that overlap on the value 40. |
| [50, 100) | [50, 100) | | With only 1 overlap in an otherwise non-overlapping set, we may break the set into 2 subsets (before and |

TABLE 1-continued

| Original set of intervals | After sorting | # Overlaps | Explanations and runtime execution |
|---|---|---|---|
| | | | after 40), search the value in each sub-set, then combine the results. |
| [0, 10) | [0, 10) | 0 | Sorted by left bounds: |
| [10, 20) | [10, 20) | | 0 < 10 < 20 < . . . < 99990. |
| [20, 30) | [20, 30) | | Intervals do not overlap. With such large series of intervals, we may |
| . . . | . . . | | accelerate the binary search by |
| [99990, 99999) | [99990, 99999) | | trying first the interval that is at an index proportional to where the target value is between the minimum and maximum values, then iterate the binary search until the right interval is found. |

Generic Handling of Input and Output Values

In some aspects, a rule language may have a wide variety of inputs and the use of special values (e.g., null, unknown, unavailable, not applicable, and/or the like) that the processing engine for executing the rules as an optimized DAG is not configured to process. Additionally, the decision management platform 110 may perform a type-check or type-cast to cast input values into different types or cast output values into different types. Accordingly, the decision management platform 110 may utilize an adaptor configured to receive these input values of one or more property expressions, pass those values as input values to a common, generic, external execution method (such as a Java execution method), and assign one or more returned values to assignable property expressions. This adaptor may be configured to work with any optimization code so that input and/or output values may be adapted (e.g., type-cast or treated to process special values) at runtime.

Such an adapter may address several issues that may occur when inputs of a rule language are converted to a compiled code, such as Java, and vice versa. For example, since the number and types of the input values may vary while the fixed external conversion method may not vary in signature, a first requirement may be that the external conversion method have a parameter that holds a generic collection of objects. For instance, a Java conversion method could be defined as taking a parameter of type Object[ ] (i.e., an array of java.lang.Object objects).

A second issue is that the input property expressions may be of types that are not directly compatible or assignable to a generic, external data type. So the external conversion method may be configured to type-cast or convert the incompatible input types to the compatible external data type. In some aspects, the decision management platform 110 may type-cast the input values by a built-in type-cast mechanism provided by the rule language. Additionally, input property expressions may hold special values indicating that an input value is null, unknown, unavailable, and/or the like. Depending on how the BRMS rule language treats those special values, the external conversion method may be configured to type-cast input expression values with these special values.

Conversely, the output values may also vary in number and types, so similar provisions to the provisions for input conversion may be taken. The fixed, external conversion method may return a collection of objects (such as Object[ ], i.e. an array of java.lang.Object objects for a Java method). Each returned value may be type-cast or converted as appropriate to the corresponding output expression type and type-cast errors may be translated into a BRMS runtime exception. Lastly, return values may contain special values that may be handled by the external conversion method as well.

As such, the external conversion method may provide a generic way to convert objects of any specific type to a default type (e.g., Object) or convert objects of a default type (e.g., Object) into any specific type. This universal conversion may reduce and/or avoid runtime error due to handling all types of input and/or output values of a rules language. While the generic handling of input and output values described above relate to a rules language and rules engine, it may also apply to other forms of optimization (such as invoking a $3^{rd}$ party data analytics execution engine).

Encoding and Embedding of Data Structures in a Rule Language

In some aspects, when processing a data structure, it may be beneficial if the data structure is preserved as it undergoes different transformations, such as from a graphical representation (e.g., a DAG), to a rule language, to Java code, and/or the like. The decision management platform 110 may encode any native or external data structure, such as a data structure used to improve the execution of rule logic, in a form that may be embedded in a BRMS rule language. The decision management platform 110 may perform the encoding and embedding in two parts, one that is applied at rule compilation time, and one that is applied at rule execution time.

At compilation time, the data structure (such as a Java object) is first serialized into a byte array. For example, referring back to operation block 270, the decision management platform 110 may serialize the data structure by Java binary serialization. Alternatively, the decision management platform 110 may use an explicit transformation from the data structure to a byte array so that the byte array may be de-serialized in any programming language.

The decision management platform 110 may compress the serialized byte array. The compression may beneficially reduce the size of the byte array to be embedded. Such compression may be useful if the data structure is very large and/or has a high degree of redundancy. Referring back to operation block 270, the decision management platform 110 may compress the serialized byte array using any available compression technique, although it may be preferable to use a portable algorithm so that the compressed byte array may be decompressed in any programming language.

Next, the decision management platform 110 may take the resulting byte array and encode it as an array of characters. The decision management platform 110 may encode using an available encoding technique, such as Base64, so that the array of characters may be decoded in any programming language.

The decision management platform 110 may then insert/embed the resulting array of characters into any string literal value, assuming that the BRMS rule language supports such a literal value. The embedding may provide a smooth transformation from a rule language to a programming language (e.g., Java) because the string essentially retains a similar structure as the original data structure and may not require any special treatment or any expansion. The string in the rule language may convert directly into the same string in Java. Later, additional rule logic may also be generated to convert the string literal value back to the original data structure.

At execution time, the additional rule logic may invoke a utility method (typically implemented in an external programming language such as Java) that reverts the above process (e.g., first decoding the characters into bytes, then decompressing those bytes if compression was used at compilation time, and finally de-serializing the uncompressed bytes into the original data structure).

Benefits of the above encoding and embedding of the data structure in a rule language are that it may reduce and/or avoid extensive, manual re-encoding. Prior translations of a data structure into an equivalent form provided by the rule language often produced rule structures that were very large and required extensive memory and compilation time, in particular when such rule structures were then converted into native equivalent code (e.g., Java/.NET/COBOL/C code). The encoding and embedding described herein may also apply to any object structure and/or any scripting or programming language.

Figure 4:
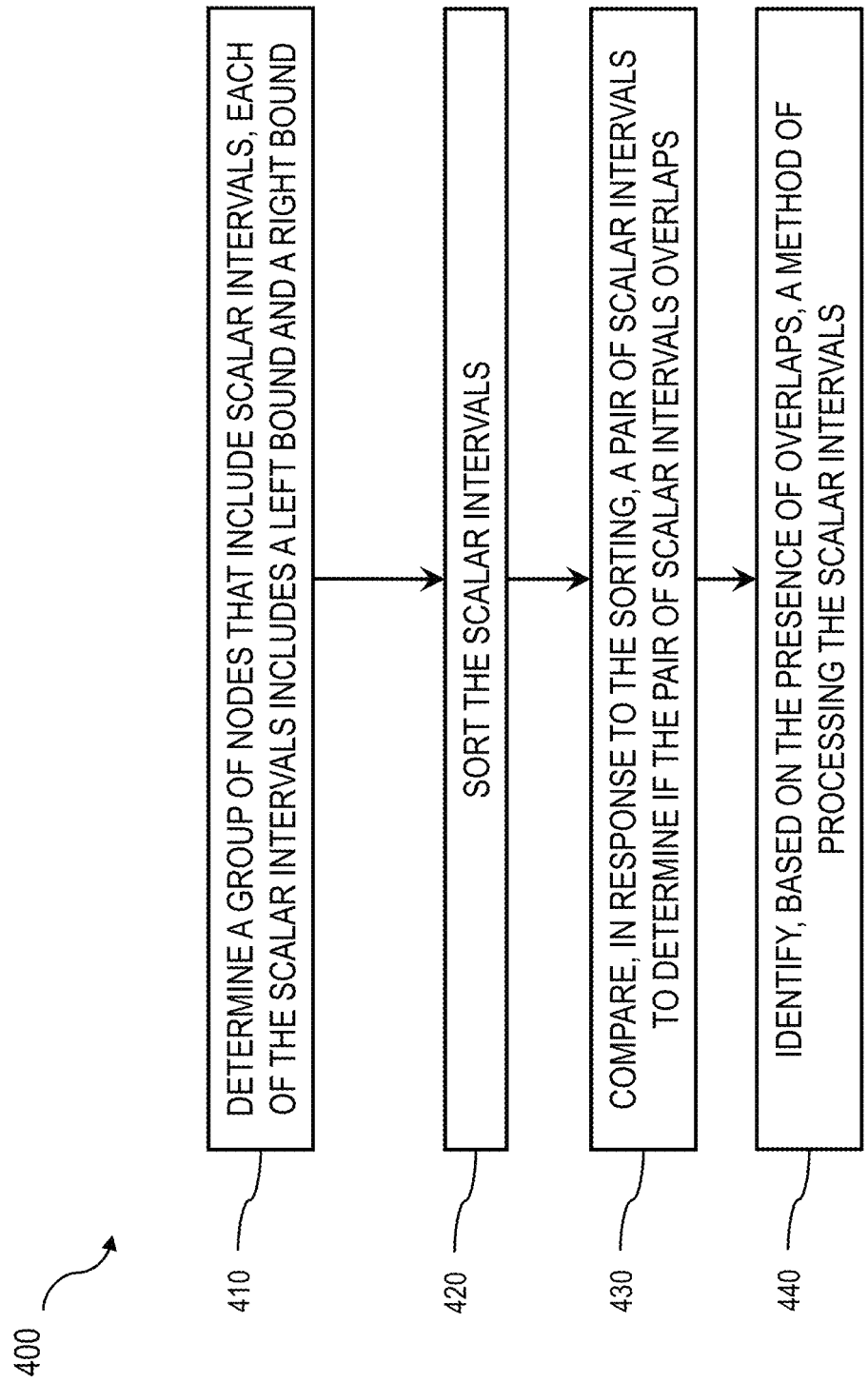
FIG. 4 depicts a flowchart illustrating a process for compilation-time analysis of scalar intervals, in accordance with some example implementations.

FIG. 3 depicts a block diagram illustrating a computing apparatus 300 consistent with implementations of the current subject matter. Referring to FIGS. 1, 2 and 4, the computing apparatus 300 may be used to implement at least a portion of the decision management platform 110, the client 130, and/or any components therein.

As shown in FIG. 3, the computing apparatus 300 may include a processor 310, a memory 320, a storage device 330, and input/output devices 340. The processor 310, the memory 320, the storage device 330, and the input/output devices 340 may be interconnected via a system bus 350. The processor 310 is capable of processing instructions for execution within the computing apparatus 300. Such executed instructions may be implement by one or more components of, for example, the decision management platform 110. In some example implementations, the processor 310 may be a single-threaded processor. Alternately, the processor 310 may be a multi-threaded processor. The processor 310 is capable of processing instructions stored in the memory 320 and/or on the storage device 330 to display graphical information for a user interface provided via the input/output device 340.

The memory 320 is a computer readable medium such as volatile or non-volatile that stores information within the computing apparatus 300. The memory 320 may store data structures representing configuration object databases, for example. In some aspects, the memory 320 may include a cache memory and/or a main memory. The storage device 330 is capable of providing persistent storage for the computing apparatus 300. The storage device 330 may be a hard disk device, an optical disk device, or a tape device, or other suitable persistent storage means. The input/output device 340 provides input/output operations for the computing apparatus 300. In some example implementations, the input/output device 340 includes a keyboard and/or pointing device. In various implementations, the input/output device 340 includes a display unit for displaying graphical user interfaces.

According to some example implementations, the input/output device 340 may provide input/output operations for a network device. For example, the input/output device 340 may include Ethernet ports or other networking ports to communicate with one or more wired and/or wireless networks (e.g., a local area network (LAN), a wide area network (WAN), the Internet). The input/output device 340 may include one or more antennas for communication over the network 120 with the decision management platform 110, client 130, and/or the repository 140.

In some example implementations, the computing apparatus 300 may be used to execute various interactive computer software applications that may be used for organization, analysis and/or storage of data in various formats. Alternatively, the computing apparatus 300 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 340. The user interface may be generated and presented to a user by the computing apparatus 300 (e.g., on a computer screen monitor, etc.).

FIG. 4 depicts a flowchart illustrating a process 400 for evaluating scalar intervals, in accordance with some example embodiments. Referring to FIGS. 1-3, the process 400 may be performed by a computing apparatus such as, the decision management platform 110, the client 130, and/or the computing apparatus 300.

At operational block 410, the computing apparatus 300, for example, may determine groups of nodes that include scalar intervals. Each of the scalar intervals includes a left bound and a right bound. In some aspects, the determining may be in response to a query for identifying the subset of scalar intervals that include a given scalar value. At operational block 420, the computing apparatus 300, for example, may sort the scalar intervals. The sorting may first be based on the left bounds of the intervals but may also be based on the right bounds. At operational block 430, the computing apparatus 300, for example, may compare, in response to the sorting, a pair of scalar intervals to determine if the pair of scalar intervals overlaps. At operational block 440, the computing apparatus 300, for example, may identify, based on the comparing indicating the presence of overlaps, a method of processing the scalar intervals. The method of processing may include a binary search method or a sequential search method.

Figure 5:
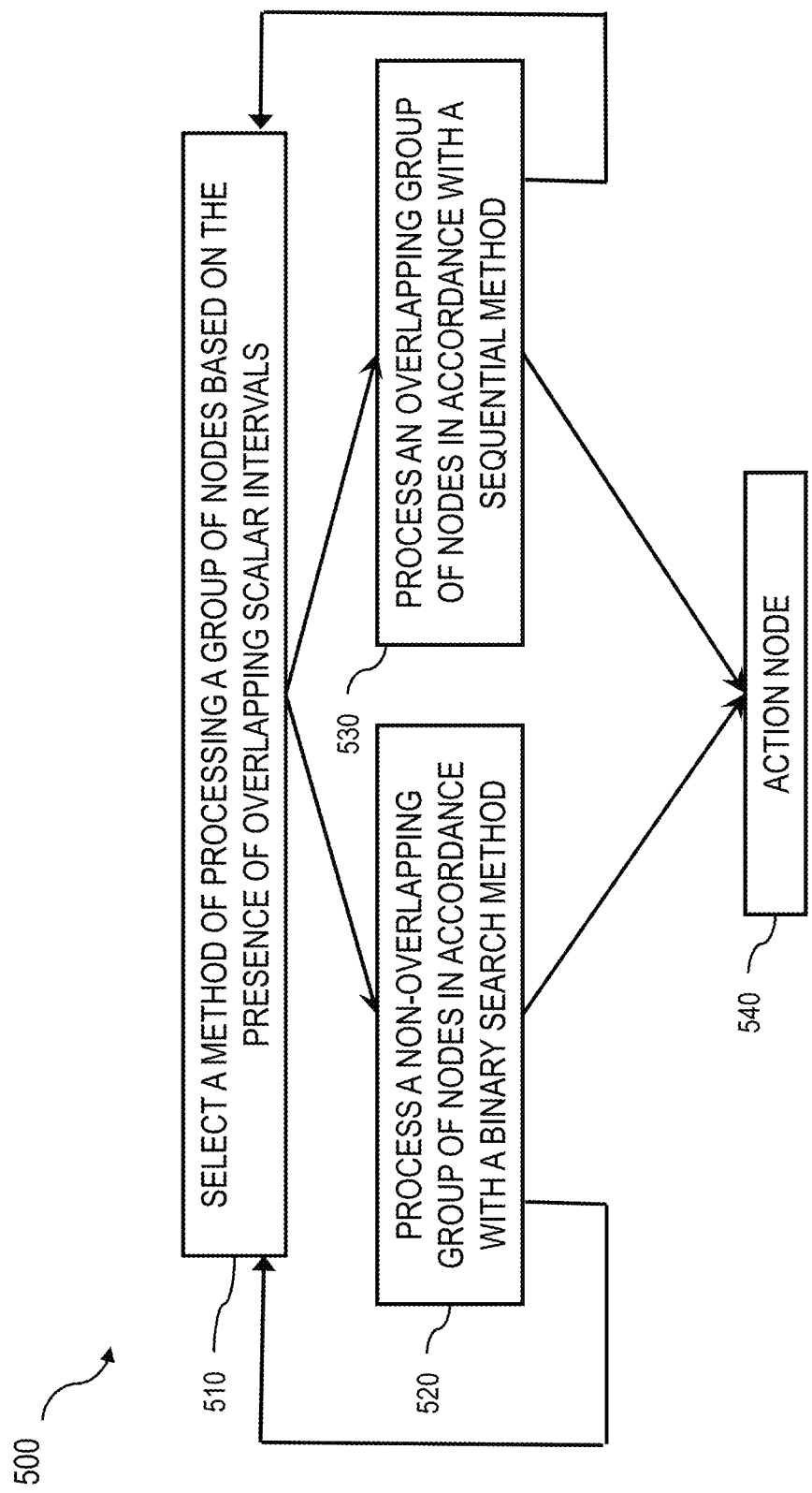
FIG. 5 depicts a flowchart illustrating a process for runtime value lookup in a set of scalar intervals, in accordance with some example implementations.

FIG. 5 depicts a flowchart illustrating a process 500 for runtime value lookup in a set of scalar intervals, in accordance with some example embodiments. Referring to FIGS. 1-3, the process 400 may be performed by a computing apparatus such as, the decision management platform 110, the client 130, and/or the computing apparatus 300. In some aspects, the process 500 may occur at runtime and after operational block 440 of FIG. 4.

At operational block 510, the computing apparatus 300, for example, may select a method of processing group of nodes of a DAG. Selecting the method of processing may include selecting a binary search method for a group containing non-overlapping scalar intervals (e.g., the Separate Ranges group) or a sequential search method for a group containing overlapping scalar intervals (e.g., the Overlapping Ranges group). After selecting the method of processing, at operational block 520, the computing apparatus 300, for example, may process a non-overlapping group of nodes in accordance with a binary search processing method. The binary search method may include a binary search algorithm as describe herein. At operational block 530, the computing apparatus 300, for example, may process an overlapping group of nodes in accordance with a sequential processing method. After processing the group in either operational block 520 or 530, at operational block 540, the computing apparatus 300, for example, may proceed to an action node of the modified DAG to complete the process 500. Alternatively, after processing the group in either operational block 520 or 530, the computing apparatus 300, for example, may recursively proceed to sub-groups of the group or to another group of the modified DAG. As shown in FIG. 5, after processing the group at either operational block 520 or 530, the process 500 may return, to operational block 510 and select another processing method for another group of nodes of the modified DAG. This recursive processing of groups may continue until each group of the modified DAG has been processed.

In some aspects, the term "variable" may be used as a generic term to represent any BRMS variable, object property, or other expression that may resolve to a value. In some implementations, a "scalar variable" may refer to a variable that contains a single value that may be relatively compared with any other value of the same type. Examples of types may include integers, dates, time, money, and/or the like. A "scalar interval" may generally refer to any interval (e.g., a set of real numbers with the property that any number that lies between two numbers in the set is also included in the set) as applied to all the aforementioned scalar types.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method for creating and executing a modified directed acyclic graph, the method comprising:
    transforming, by the at least one processor, a ruleset of a decision management platform into a directed acyclic graph;
    analyzing, by the at least one processor, the directed acyclic graph to identify similarities across branch conditions and/or nodes of the directed acyclic graph, the analyzing comprising:
        scanning branches of the directed acyclic graph to determine conditions and/or rules applicable to a branch;
        determining that the branch comprises a plurality of scalar intervals into which a scalar variable value is located, each of the scalar intervals comprising a left bound and a right bound;
        partially sorting the set of scalar intervals based on the left bounds of the scalar intervals;
        checking the partially sorted plurality of scalar intervals for overlaps; and
        creating, by the at least one processor, the modified directed acyclic graph comprising a grouping of the plurality of scalar intervals, the grouping comprising a separate ranges group when there are no overlaps or an overlapping ranges group when there are overlaps;
    in response to a query for a target value, processing the scalar intervals using a processing method selected for optimized performance in view of the grouping, the processing comprising:
        using a binary search algorithm when the grouping comprises a separate ranges group, or
        keeping all of the plurality of intervals in their original order and sequentially considering each interval and comparing its bounds with the target value when the grouping comprises an overlapping ranges group.

2. The method of claim 1, wherein the checking comprises determining whether the left bounds are open or closed when left bound values are identical.

3. The method of claim 1, wherein the sorting is further based on right bound values when left bound values are identical and the left bounds are either both open or both closed.

4. The method of claim 1, wherein the checking comprises:
    comparing, by the at least one processor, a first right bound value of a first scalar interval with a second left bound value of a second scalar interval, wherein the first scalar interval precedes the second scalar interval; and
    determining, by the at least one processor, that the first scalar interval overlaps with the second scalar interval when the first right bound value is greater than the second left bound value.

5. A system comprising:
    at least one programmable processor; and
    a machine-readable medium storing instructions that, when executed by the at least one processor, cause the at least one programmable processor to perform operations comprising:
    transforming a ruleset of a decision management platform into a directed acyclic graph;
    analyzing the directed acyclic graph to identify similarities across branch conditions and/or nodes of the directed acyclic graph, the analyzing comprising:
        scanning branches of the directed acyclic graph to determine conditions and/or rules applicable to a branch;
        determining that the branch comprises a plurality of scalar intervals into which a scalar value is located, each of the scalar intervals comprising a left bound and a right bound;
        partially sorting the set of scalar intervals based on the left bounds of the scalar intervals;
        checking, the partially sorted plurality of scalar intervals for overlaps; and
        creating the modified directed acyclic graph comprising a grouping of the plurality of scalar intervals, the grouping comprising a separate ranges group when there are no overlaps or an overlapping ranges group when there are overlaps; and
    in response to a query for a target value, processing the scalar intervals using a processing method selected for optimized performance in view of the grouping, the processing comprising:
        using a binary search algorithm when the grouping comprises a separate ranges group, or
        keeping all of the plurality of intervals in their original order and sequentially considering each interval and comparing its bounds with the target value when the grouping comprises an overlapping ranges group.

6. The system of claim 5, wherein the checking comprises determining whether the left bounds are open or closed when left bound values are identical.

7. The system of claim 5, wherein the checking comprises:
   comparing a first right bound value of a first scalar interval with a second left bound value of a second scalar interval, wherein the first scalar interval precedes the second scalar interval; and
   determining, that the first scalar interval overlaps with the second scalar interval when the first right bound value is greater than the second left bound value.

8. A non-transitory computer program product storing instructions that, when executed by at least one programmable processor, cause at least one programmable processor to perform operations comprising:
   transforming a ruleset of a decision management platform into a directed acyclic graph;
   analyzing the directed acyclic graph to identify similarities across branch conditions and/or nodes of the directed acyclic graph, the analyzing comprising:
      scanning branches of the directed acyclic graph to determine conditions and/or rules applicable to a branch;
      determining that the branch comprises a plurality of scalar intervals into which a scalar value is located, each of the scalar intervals comprising a left bound and a right bound;
      partially sorting the set of scalar intervals based on the left bounds of the scalar intervals;
      checking, the partially sorted plurality of scalar intervals for overlaps; and
      creating the modified directed acyclic graph comprising a grouping of the plurality of scalar intervals, the grouping comprising a separate ranges group when there are no overlaps or an overlapping ranges group when there are overlaps; and
   in response to a query for a target value, processing the scalar intervals using a processing method selected for optimized performance in view of the grouping, the processing comprising:
      using a binary search algorithm when the grouping comprises a separate ranges group, or
   keeping all of the plurality of intervals in their original order and sequentially considering each interval and comparing its bounds with the target value when the grouping comprises an overlapping ranges group.

* * * * *